United States Patent [19]
French

[11] 4,232,392
[45] Nov. 4, 1980

[54] RADIO TRANSMISSION SYSTEMS

[75] Inventor: Richard C. French, Horsham, England

[73] Assignee: U.S. Philips Corporation, New York, N.Y.

[21] Appl. No.: 938,046

[22] Filed: Aug. 30, 1978

[30] Foreign Application Priority Data

Sep. 9, 1977 [GB] United Kingdom ............... 37729/77

[51] Int. Cl.³ .............................................. H04B 1/02
[52] U.S. Cl. ..................... 455/105; 455/52; 455/54; 455/116
[58] Field of Search ............ 325/154, 156, 157, 51–53, 325/56, 58, 65, 62, 158; 343/207–208

[56] References Cited
U.S. PATENT DOCUMENTS 1,806,666  5/1931  Bown ................................... 325/154
1,988,275  1/1935  Harbich ................................ 325/154

FOREIGN PATENT DOCUMENTS 304781  1/1930  United Kingdom .................... 325/157

*Primary Examiner*—Marc E. Bookbinder
*Attorney, Agent, or Firm*—Thomas A. Briody; William J. Streeter; Edward W. Goodman

[57] ABSTRACT

A radio transmission system is disclosed having a base station with a plurality of spaced radio transmitters in which an information signal is simultaneously transmitted on the same carrier frequency channel from all the transmitters. Each information signal is transmitted at least twice while the relative transmission powers of the transmitters are varied between one transmission of an information signal and a subsequent retransmission of the same information signal.

5 Claims, 4 Drawing Figures

RADIO TRANSMISSION SYSTEMS

BACKGROUND OF THE INVENTION

This invention relates to radio transmission systems in which a message signal is simultaneously transmitted in the same carrier frequency channel from a plurality of radio transmitters.

Such systems are known and are used, for example, in vehicle communication and paging systems in order to cover a large area with improved uniformity of signal strength. Transmitter sites are located so that shadow areas of one transmitter are filled in as far as possible by other transmitters.

Very large areas have been covered by such a system with good results in all locations where a carrier signal received from one of the transmitters is considerably stronger than any signal received from another transmitter. In areas where nearly equal carrier signal levels are received from two transmitters, there can be severe interference, giving loss of speech intelligibility and high error rates in digital data systems. Such areas are hereinafter referred to as overlap areas.

In order to reduce this distortion, very high stability reference oscillators (accuracy of one part in $10^{-9}$) are used at each transmitter site and the delays in the links (land-line or radio) between the originating base station and the various transmitters are equalised. As a result, the carriers transmitted from the transmitters are almost in synchronism—i.e. quasi-synchronous transmission. Further, it is usual to adjust the frequency deviation in FM transmitters, or the depth of modulation in AM transmitters, to be the same for all transmitters. A general description of quasi-synchronous transmission and a discussion of message distortion in overlap areas is given in the article "Quasi-synchronous transmission," Communications International, June 1976, pages 27, 32 and 35.

Even with such precautions, however, the distortion problems still arise when the received carrier levels closely approach each other, for example within 3 dB in FM systems and 6 dB in AM systems. Distortion exists to a greater or lesser degree, irrespective of whether the carriers are frequency- or amplitude-modulated and of whether the message is in the form of speech or a data bit stream. The particular type of distortion experienced does, however, depend upon those factors.

Quasi-synchronous systems are frequently used for data transmission, for example in vehicle identification systems, paging systems, and message transmission. In such systems, the size of the overlap area in which the data signal is not successfully captured is dependent upon the bit rate, i.e. the higher the bit rate the larger the overlap area. It has been shown that, in a large multi aerial system, the overlap areas are very small if the bit rate is in the region of 300 bits per second. In commonly-used systems having carrier frequencies spaced at 25 kHz in the VHF or UHF band concerned, the maximum bit rate is 9600 bits per second; so a very heavy penalty is paid, in terms of the maximum number of messages transmitted per unit of time, in order to reduce the size of the overlap areas. In the case concerned, thirty two times as many messages could be sent if the maximum bit rate of 9600 bits per second could be used.

SUMMARY OF THE INVENTION

The object of the invention is to mitigate the effects of such distortion and hence to enable a considerably higher message rate to be achieved, irrespective of whether frequency or amplitude modulation, and of whether the information signal is in the form of a tone, speech, or data bits.

Accordingly, the invention provides a radio transmission system, comprising a base station having a plurality of spaced radio transmitters, in which an information signal is simultaneously transmitted in the same carrier frequency channel from all the transmitters, wherein each information signal is transmitted at least twice and wherein the system includes means for varying the ratio of the transmission powers of at least two of the transmitters between one transmission of an information signal and a subsequent re-transmission of the same information signal.

The advantage of such a system according to the invention is that the overlap areas in which distorted messages are received change their locations when the ratio of the transmission powers of the transmitters concerned is changed between the transmission of two of said information signals. Thus if, for example, a receiver is located in an overlap area such that one transmission of an information signal is received in distorted form, the overlap area of a subsequent retransmission of the same information signal will be elsewhere and so this second information signal should be received without distortion by the receiver.

In typical systems, overlap areas exist where the received signal levels of the two carriers are within 3 dB of each other. Thus if the carrier power of one of the transmitters is changed by at least 3 dB, the area will no longer be an overlap area.

The invention further provides a radio transmission system, comprising a base station having a plurality of spaced radio transmitters, in which an information signal is simultaneously transmitted in the same carrier frequency channel from all the radio transmitters, wherein each information signal is transmitted at least twice and wherein the system includes transmitter control means operable to reduce the transmission power of at least one, but not all, of the transmitters for the duration of at least one, but not all, of the transmissions of each information signal. This further provision of the invention achieves the desired object by reducing the carrier signal transmission power of some of the transmitters, in order to shift the locations of the overlap areas, for some of the information signal transmission. This has the advantage that the transmitters not so reduced operate at their normal full power.

In order to take maximum advantage of the many possible combinations of reduced and non-reduced transmission powers in a quasi-synchronous system, the pattern of the transmission powers is preferably different for each of the transmissions of a message signal. Thus a different combinational pattern may be provided at each transmission of the information signal.

It is to be noted that it is known to adjust the relative transmission powers of two stations in order to shift the overlap area; see for example U.S. Pat. No. 1,988,275. Such adjustment is made on a permanent basis, however, in order to shift the overlap area so that it covers, if possible, less densely-populated areas, e.g. lakes, where usage of the system is minimal.

The transmission power of one or more of the transmitters may remain the same throughout all the transmissions. This has the advantage that there is no need to provide means for reducing the transmission power at these transmitter sites; so reducing the overall system cost.

The transmission power is preferably reduced by an integral multiple of 3 dB. This enables two or more transmitters to have their carrier powers reduced by different amounts whilst still exhibiting at least a 3 dB change in power with respect to each other. Thus, for example, three transmitters may have their carrier powers simultaneously reduced by 3, 6 and 9 dB respectively. Then not only is there a difference of at least 3 dB between the carrier powers of these transmitters but also each of them differs by at least 3 dB from the remaining one or more transmitters which are operating at non-reduced carrier power.

The invention further provides a method of radio transmission in which an information signal is transmitted simultaneously in the same carrier frequency channel from a plurality of radio transmitters under the control of a base station, wherein each information signal is transmitted at least twice; the method including the step of varying the ratio of the transmission powers of two of the transmitters between one transmission of an information signal and a subsequent transmission of the same message signal.

The invention further provides a method of radio transmission in which a message signal is transmitted simultaneously in the same carrier frequency channel from a plurality of radio transmitters under the control of a base station, wherein each information signal is transmitted at least twice; the method including the step of reducing the transmission power of at least one, but not all, of the transmitters for the duration of at least one, but not all, of the transmissions of each information signal.

DESCRIPTION OF THE DRAWINGS

Embodiments of the invention will now be described by way of example, with reference to the accompanying drawings, of which

DESCRIPTION OF THE PREFERRED EMBODIMENT

Figure 1:
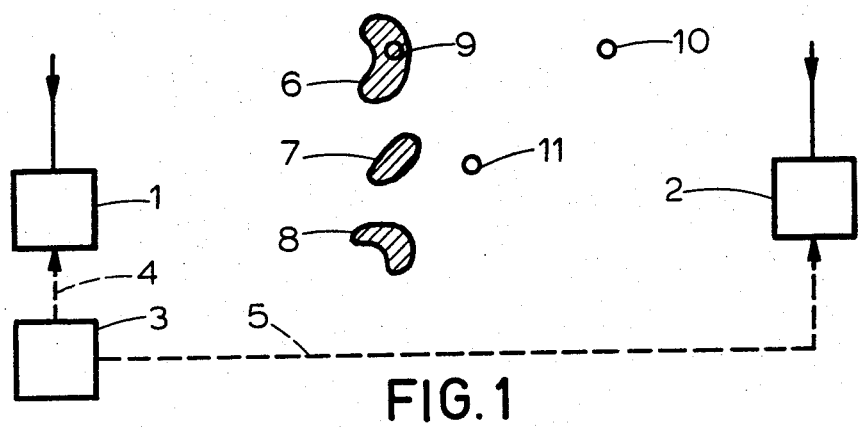
FIG. 1 shows possible overlap areas in the known case of two transmitters having fixed transmission powers.

FIG. 1 shows two transmitters 1 and 2 controlled by a base station 3 via land lines, or radio links, 4 and 5 respectively. The transmitters each transmit a carrier frequency, for example 100 MHz, modulated by information signals fed from base station 3 via land lines or radio links 4 and 5. In order to achieve quasi-synchronous operation, the signal delays of lines 4 and 5 are made substantially the same by adding an appropriate "padding" delay to the shorter line. Small overlap areas 6, 7 and 8 are shown where nearly equal carrier signal levels occur from the two transmitters and where reception would be unreliable. The size and number of these overlap areas will be dependent upon the topography of the reception area; in cities a large number of small areas occur, but in rural situations there will be fewer, larger, overlap areas. A receiver station 9, for example carried by a person or mounted in a vehicle, is shown in overlap area 6 and further receiver stations 10 and 11 are located external to the overlap areas and, hence, in a reliable reception area. Thus receiver station 9 is unlikely to capture a transmitted information signal but receiver stations 10 and 11 should capture the signal successfully.

Figure 2:
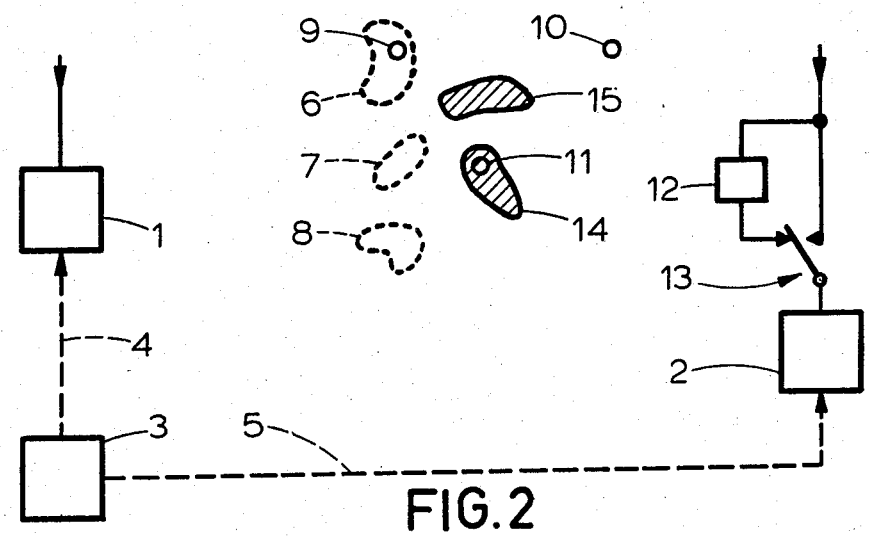
FIG. 2 shows the same topographical situation but with the carrier power of one of the transmitters reduced.

FIG. 2 shows the same topographical configuration as FIG. 1 but, in this case, an attenuator 12 and a switch 13 are included in the aerial feeder of transmitter 2. With switch 13 in the switching position shown, attenuator 12 is inserted in series in the aerial feeder and reduces the transmitted signal level by, for example, 3 or 6 dB. With switch 13 in the other position, attenuator 12 will be bypassed and the condition would be as shown in FIG. 1. Switch 13 is controlled from base station 3 in a manner to be described hereinafter. Due to the reduction in transmitted signal power of transmitter 2 by attenuator 12 and switch 13, the ratio of the signal powers of the two transmitters is changed with respect to FIG. 1 and, hence new overlap areas 14 and 15 appear in different locations from the original overlap areas 6, 7 and 8 which now no longer exist. Receiver 9 is no longer in an overlap area and should capture the information signal. The situation concerning receiver station 10 remains unchanged but receiver station 11 is now located within the new overlap area 14 and the chances of capture are reduced for this particular transmission of the information signal.

Thus if an information signal is transmitted a first time with switch 13 in the other position to that shown (corresponding to the state shown in FIG. 1) and a second time with switch 13 in the position shown (see Table 1), then receivers 9 and 11 should capture at least one of the two information signals correctly. The probability of capture by any receiver, wherever located in the region covered by the two transmitters, has therefore been considerably increased with respect to the condition shown in FIG. 1, even if there were considerably more than two message transmissions in the latter case. Thus, for the same probability of capture in both cases, the transmitter bit rate can be considerably increased.

The ratio of the transmission powers of transmitters 1 and 2 can be changed by increasing the power normally transmitted by either transmitter, of course, but this would be considerably more expensive in terms of equipment.

It is to be noted that the transmission power of transmitter 1 remains unchanged throughout in the embodiment shown in FIG. 2. It is alternatively possible, of course, to provide transmitter 1 with a respective attenuator and switch in the same manner as for transmitter 2 and to arrange for base station 3 to operate the switches out of phase with each other (see Table 2). Though this would be more costly, it may be useful in some circumstances in order to increase the distance shifted by the overlap areas, when the transmitted power ratio is changed.

Various operational sequences can be used, depending upon the number of transmitters and on the number of times each 'message' is transmitted. If the power normally transmitted by each aerial is P0 and the power transmitted in the attenuated state is P1, typical transmission sequences such as those shown in Tables 1 to 3 may be used. Table 1 refers to the single attenuated transmitter case shown in FIG. 2 and Tables 2 and 3 show possible transmission sequences for the case where each of the two transmitters can be attenuated.

TABLE 1

|  | TRANSMITTERS | |
|---|---|---|
|  | 1 | 2 |
| 1st transmission | P0 | P0 |
| 2nd transmission | P0 | P1 |
| 3rd transmission etc. | P0 | P0 |

TABLE 2

|  | TRANSMITTERS | |
|---|---|---|
|  | 1 | 2 |
| 1st transmission | P0 | P1 |
| 2nd transmission | P1 | P0 |
| 3rd transmission etc. | P0 | P1 |

TABLE 3

|  | TRANSMITTERS | |
|---|---|---|
|  | 1 | 2 |
| 1st transmission | P0 | P0 |
| 2nd transmission | P0 | P1 |
| 3rd transmission | P1 | P0 |
| 4th transmission etc. | P0 | P0 |

The degree of attenuation needed in any transmitter to render an overlap area usable will depend on the parameters of the radio system. For example a typical FM system would require a signal attenuation of about 6 dB to give a usable speech signal and of about 3 dB to give a usable data signal. In general the attenuation required is not so great as to make the service area of the reduced-power transmitter too small to be useful.

The principle so far described can, of course, readily be extended to larger systems using more than two transmitters and the amount of power reduction in a transmitter may be variable, for example by 3, 6 or 9 dB. Table 4 shows a few possible patterns of transmitter powers at the start of a transmission sequence for a system having N transmitters, a normal transmission power of P0, and reduced transmission powers of P1, P2 and P3 being, for example, 3, 6 and 9 dB below power P0 respectively.

TABLE 4

|  | TRANSMITTER NUMBER | | | | |
|---|---|---|---|---|---|
|  | 1 | 2 | 3 | 4 | N |
| 1st transmission | P0 | P0 | P0 | P0 | P0 |
| 2nd transmission | P1 | P0 | P0 | P1 | P0 |
| 3rd transmission | P2 | P1 | P0 | P2 | P0 |
| 4th transmission etc. | P0 | P1 | P3 | P2 | P2 |

It is not necessary, of course, for the patterns to be consecutive for each information signal. A whole series of different information signals—intended for different receiving stations may be sent as a batch with the first transmission pattern, repeated for the second transmission pattern, and so on.

Figure 3:
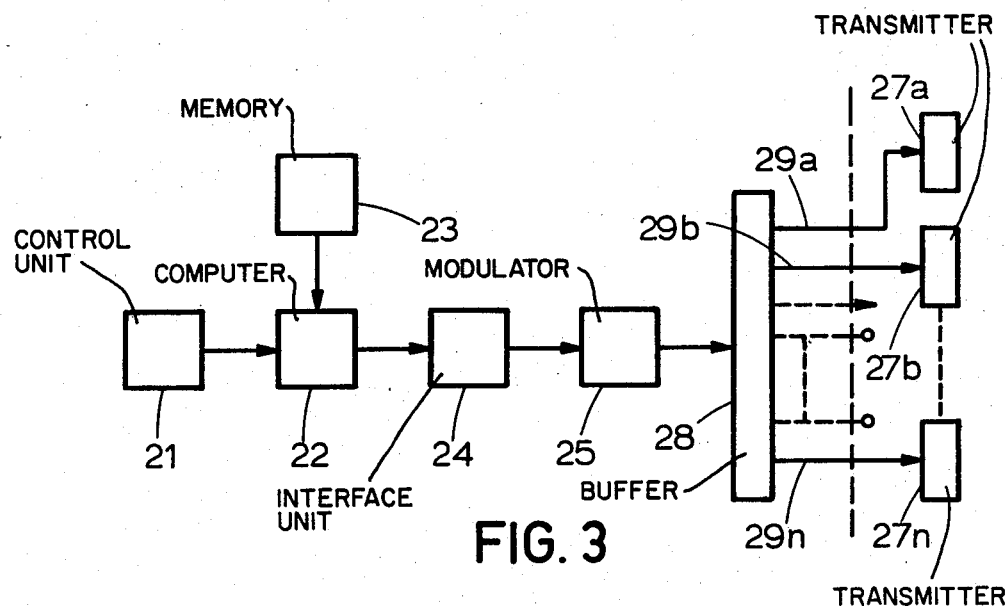
FIG. 3 shows a block schematic circuit diagram of a system according to the invention.

FIG. 3 shows a practical implementation of a system according to the invention of the transmission of digital data messages to mobile or stationary receivers.

The apparatus shown in FIG. 3 comprises a system operator's control unit 21 connected to a computer 22 provided with a memory 23. The computer 22 assembles the information fed to it from unit 21 and memory 23 according to a prearranged program and feeds it to a conventional computer interface unit 24, typically comprising a flip-flop type register. The output of interface unit 24 is fed to a modulator 25 in which the output from unit 24 modulates a carrier frequency generated by an oscillator (not shown) to provide a frequency or amplitude modulated signal suitable for transmission to each of a plurality of transmitter sites 27a, 27b, to 27n via respective buffers 28 and land lines (for example telephone lines) 29a, 29b and 29n. The transmission system used in practice would generally be a frequency division multiplex (FDM) system. At each transmission site, the FDM signals are demodulated to recover the original information signals and are used to modulate the transmitter carrier frequency.

The control unit 21 typically comprises a conventional visual display unit by means of which the operator can key up the required information and visually check it before passing it on to the computer 22. All the apparatus items shown in FIG. 3 are well known in computer technology and, since they are not relevant to the invention, will not be described further other than by their operational sequence, a typical example of which will now be described with reference to Tables 5 and 6.

Table 5 refers to the case shown in Table 4 in which it is assumed that at least some of the transmitters can have their transmission powers set to P0 (normal, or maximum level), P1 (for example 3 dB below P0, P2 (e.g. 6 dB below P0), and P3 (e.g. 9 dB below P0). Each of these levels is represented by a four-bit control code as shown in Table 5. Alternative codes can equally well be used.

TABLE 5

| Symbol | Power Level | 4 bit code |
|---|---|---|
| P0 | Normal | 1111 |
| P1 | −3dB | 1100 |
| P2 | −6dB | 0011 |
| P3 | −9dB | 0000 |

Table 6 shows an example of a computer program by means of which the computer assembles all the relevant information to be passed to the interface unit. In this example, the system is assumed to be of the type in which a message signal can be sent to any one or more of a plurality of receivers by transmitting the address code of the receiver(s). On reception of its address code, the or each receiver may give an audible and/or visual signal (for example in a paging system) but it is assumed here that a message is also transmitted following the address code.

Referring again to FIG. 3, the computer memory 23 stores:

(a) Preamble 1—comprising a bit sequence (e.g. 128 bits in the repetitive sequence 010101—) for bit synchronisation at the base station, (b) Preamble 2—comprising a bit sequence (e.g. 64 bits) for word synchronism at the base station, (c) Preamble 3—comprising a bit sequence (e.g. 128 bits in the repetitive sequence 010101—) for bit synchronism in the receiver station, (d) Preamble 4—comprising a bit sequence (e.g. 32 bits) for word synchronisation in the receiver station, (e) Power level patterns for each of the transmitters for each of the various transmissions. Thus in the first transmission sequence, the transmitted power levels of the transmitter sites may be required to be, starting with site 27a, P0 (1111), P0 (1111), P0 (1111), etc; in the second transmission, P0 (1100), P0 (1111), P0 (1111), P1 (1100), and so on in the manner shown in Table 4. Each pattern is stored as an individual continuous sequence, i.e. 1111 1111 1111..., 1100 1111 1111 1100..., etc.

(f) An 'end of transmission' or 'stop' code, for example a 128 bit code.

The system operator keys in the address code of the required receiver station(s) followed by message bits constituting, in the present embodiment, alphanumeric characters. The computer 22 checks that the address and message are complete and stores them. It then outputs Preambles 1 and 2 to provide bit and word synchronisation at the base station and follows this with the transmitter power level codes, drawn from memory 23, for each of transmitter sites 27a to 27n in sequence. This is followed by Preambles 3 and 4, also drawn from memory 23, to provide bit and word synchronisation for all the receivers. It then outputs the receiver address code and the message characters, each comprising an 5-bit code for example, received from unit 21. It then transmits the end of message code. This completes the first transmission sequence.

The sequence is then repeated with the omission of Preamble 1. This time, the second pattern of transmitter power levels is drawn from memory 23. The sequence is then repeated as many times as required using the appropriate power level pattern for each sequence.

TABLE 6

| INFORMATION | SOURCE | BIT LENGTH |
|---|---|---|
| Preamble 1 | Memory 23 | 128 |
| Preamble 2 | Memory 23 | 64 |
| Power level, 27a ⎫ First Pattern | Memory 23 | 4 |
| Power level, 27b ⎬ | Memory 23 | 4 |
| Power level, 27n ⎭ | Memory 23 | 4 |
| Preamble 3 | Memory 23 | 128 |
| Preamble 4 | Memory 23 | 32 |
| Receiver address | Unit 22 | 16 |
| Message character 1 | Unit 22 | 8 |
| Message character m | Unit 22 | 8 |
| End of transmission | Memory 23 | 128 |

The sequences are passed to the transmitter sites 27a to 27n from the interface unit 24 via the modulator 25, the buffers 28, and lines 29a to 29n.

Figure 4:
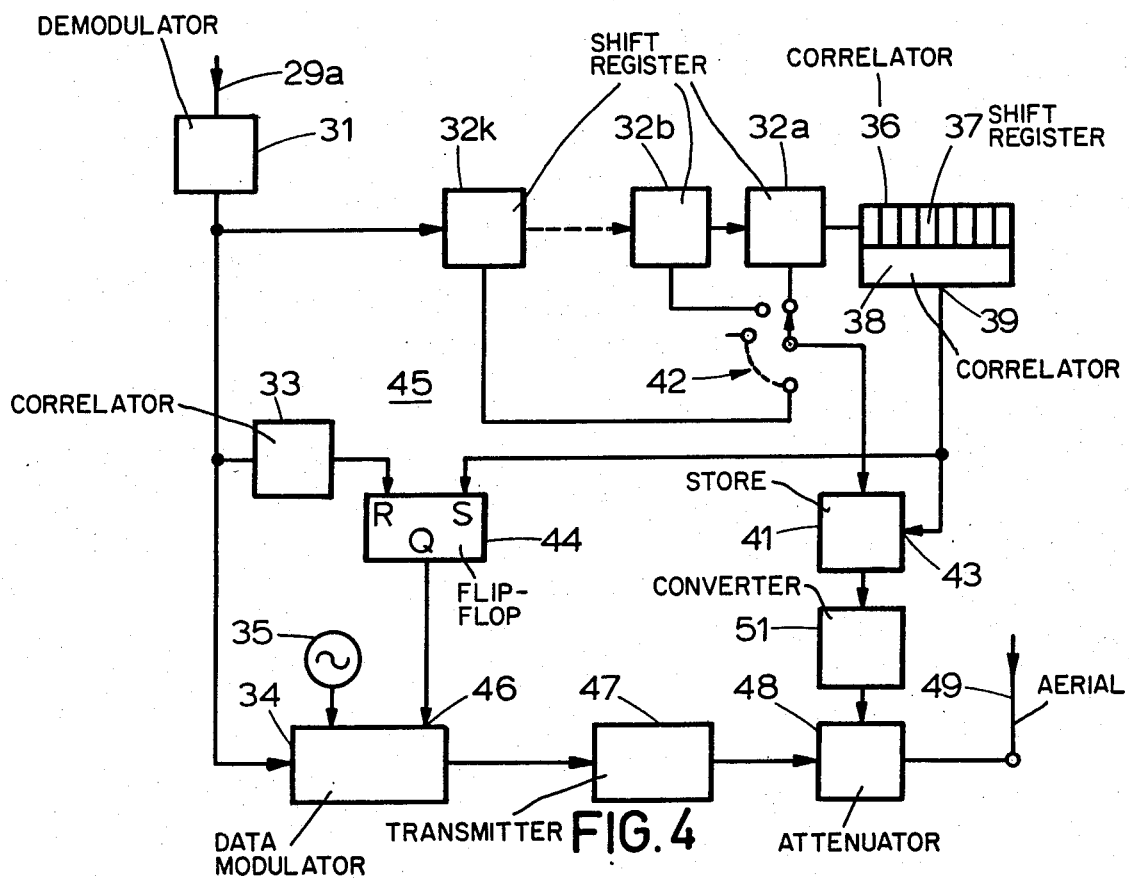
FIG. 4 shows a block schematic circuit diagram of the apparatus at a transmitter site.

The equipment at each transmitter site is shown in FIG. 4. The incoming signals, for example from line 29a, are demodulated by a demodulator 31 to recover the original information signals, the latter then being passed to a number of four-bit shift registers 32k, 32b, 32a in series, the number k being the number of transmitter sites of the type shown in FIG. 4. The signals from demodulator 31 are also fed to an end of transmission correlator 33 and to a data modulator 34 provided with a carrier frequency generator 35. The output of shift register 32a is fed to a "Preamble 2" correlator 36 which may be an autocorrelator comprising a shift register 37 for receiving the incoming bits and correlation means 38 which correlates the bit sequence in the shift register 37 with a stored Preamble 2 code and provides an output signal at output 39 when the two correlate.

The contents of any of the shift registers 32a to 32k can be fed into a four-bit memory refresh store 41 via a preset selector switch 42. The position of this switch is preset at each transmitter site to select that one of the four-bit shift register 32a to 32k that is relevant to that site, as will be apparent from the following description. The autocorrelation output 39 of correlator 36 is fed to the 'load' input 43 of the four-bit store 41 and also to the set input S of a transmission control flip-flop 44.

End of transmission correlator 33 is of a similar autocorrelation type to correlator 36 and gives an output signal at output 45 when the bits contained in its shift register correlate with the end of transmission code stored therein. Output 45 of correlator 33 is connected to the reset input R of flip-flop 44. The Q output of flip-flop 44 is connected to an inhibit input 46 of modulator 34.

The output of modulator 34 is connected to a radio transmitter 47 the output of which is fed via a switchable attenuator 48 to a transmitting aerial 49.

The output of four-bit store 41 is connected to a converter unit 51, which converts the four-bit code stored in store 41 into a form suitable to switch switchable attenuator 48 to the value, e.g. 0 dB, 3 dB, 6 dB or 9 dB, represented by the four-bit code.

In order to drive the various shift registers in synchronism with the incoming bit stream, the output of demodulator 31 is connected to a bit recovery circuit (not shown) which recovers the bit clock rate in a conventional known manner.

The operation of the circuit shown in FIG. 4 is as follows. It is assumed that the transmitter is switched on and that flip-flop 44 is initially in the reset state. The logic '0' level on its Q output inhibits the operation of modulator 34 such that it either provides no output signal to transmitter 47 or it provides only the carrier signal from oscillator 35. The latter is generally preferred in frequency modulation systems since the receivers then remain "locked-on" to the transmitted carrier frequency.

The bit sequence shown in Table 6 appears at the output of demodulator 31 and is passed to the series of shift registers 32k...32b, 32a, 36. Preambles 1 and 2 are used to establish bit and word synchronisation in demodulator 31 and are also shifted through shift registers 32k...32b, 32a and 36 followed by the transmission power level codes; etc. At the instant that the whole of Preamble 2 appears in shift register 37, autocorrelation occurs and an output signal is given at output 39 of correlator 36. At this instant, the respective level transmission codes for transmitter sites 27a to 27n appear in respective shift registers 32a to 32k where k is equal to or less than n (since one or more of the transmitter powers may not be controlled).

It is assumed that the circuit shown in FIG. 4 relates to transmitter site 27a and, therefore, switch 42 is preset to select the bits appearing in shift register 32a. Switch 42 is set to select the appropriate shift register at each station.

The autocorrelation output signal from correlator 36 causes the four-bit code appearing in shift register 32a to be loaded into store 41 (replacing any existing code therein) and also causes flip-flop 44 to be set and, hence, to enable modulator 46. The four-bit code is converted by converter 51 to a form which causes switchable attenuator to be set to the attenuation level represented by the code.

One bit later —i.e. the first bit of Preamble 3, correlation is no longer achieved by correlator 32 and the signal at its output 39 is removed. The contents of store 41 cannot therefore be changed. Flip-flop 44 remains in the set condition, of course. Thus Preamble 3, the receiver address code, and the message character bits are transmitted from aerial 49 at a power level determined by the setting of switchable attenuator 48.

Following the message characters, the end of transmission code is received at the output of modulator 31. This code is transmitted via aerial 49 and, on receipt of the last bit thereof, end of transmission correlator 33 responds to the code and produces a signal at output 45 which resets flip-flop 44. The output of flip-flop 44 now inhibits modulator 34 so that no further information signals are transmitted from aerial 49.

The sequence is then repeated, this time with a different pattern of transmitter power levels but with the remaining signals the same. Thus the topographical arrangement of the overlap regions will change and a receiver located in an overlap region for the first message will, in all probability, be clear of such a region for the second, or a subsequent, sequence and should capture the message successfully.

The message characters shown in Table 6 may, of course, be replaced by a speech or tone message and the receiver address may alternatively be in the form of tone signals. The modulation system(s) would be modified accordingly in such cases.

In order to achieve more optimum usage of the channel and increase the number of messages sent in unit time, information could more advantageously be sent from the base station to each transmitter site in separate channels. For example the Preambles 1, 2 and 3 could be sent to each transmitter site, together with the power level codes, over a control channel and the signals to be transmitted (address, message, and end of transmission codes) sent in parallel over a separate transmission channel.

In practice, where many messages have to be transmitted to different receiver locations, then the messages would be sent in groups in each sequence. Thus, for example, the sequence shown in Table 6 would include a group of say, 100 addresses and messages following one after another; after which the end of transmission code is transmitted. The next sequence, which repeats the whole group of addresses, is then transmitted with a different pattern of transmission power levels, and so on. This avoids the need to change the transmission power levels after each message, and so the transmission time is substantially entirely occupied by messages.

Although the bit rate used will, to some extent, depend upon the particular topographical arrangement concerned, the system according to the invention will in general allow the normal bit rate of 300 bits per second to be increased eight to ten times. This increase is, of course, a compromise because the maximum possible bit rate of 9600 Hertz (in the case of a 25 kHz carrier spacing system) creates rather large and unwieldy overlap areas where the chances of capture are relatively low. Assuming an improvement factor of eight, for example, each message could be repeated, say, four times and twice as many messages could be sent in the same unit time as for the known system using 300 bits per second.

I claim:

1. A radio transmission system, comprising a base station having a plurality of spaced radio transmitters, in which an information signal is simultaneously transmitted in the same carrier frequency channel from all the radio transmitters, each information signal being transmitted at least twice, said system having transmitter control means operable to reduce the transmission power of at least one, but not all, of the transmitters for the duration of at least one, but not all, of the transmissions of each information signal, in which the transmission power at one or more of the remaining transmitters remains the same for all transmissions of each information signal, wherein each transmitter, the transmission power of which can be reduced by the control means, is provided with a respective attenuator and switch, the switch being controllable by the control means to switch the attenuator into a transmission circuit to provide said reduction of the transmission power of that transmitter.

2. The system as claimed in claim 1 wherein each of at least two of the transmitters is provided with a respective attenuator and switch and wherein the control means is arranged to send a common composite attenuator-switching signal from the base station to all the transmitters provided with such an attenuator and switch, each of which transmitters further includes a switching signal selector arranged to select from the composite signal a part thereof which is only applicable to that particular transmitter and to operate the switch accordingly.

3. The system as claimed in claim 2 wherein the transmission power is reduced by an integral multiple of 3 dB.

4. The system as claimed in claim 3 wherein the information signal at least partly comprises a speech signal.

5. The system as claimed in claim 3 wherein the information signal at least partly comprises logic data bits.

* * * * *